(12) United States Patent
Morotomi et al.

(10) Patent No.: US 11,338,801 B2
(45) Date of Patent: May 24, 2022

(54) COLLISION AVOIDANCE DEVICE

(71) Applicant: TOYOTA JIDOSHA KABUSHIKI KAISHA, Toyota (JP)

(72) Inventors: Kohei Morotomi, Shizuoka-ken (JP); Masayuki Katoh, Gotemba (JP); Noriyuki Tsuruoka, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 134 days.

(21) Appl. No.: 15/921,897

(22) Filed: Mar. 15, 2018

(65) Prior Publication Data
US 2018/0265083 A1   Sep. 20, 2018

(30) Foreign Application Priority Data
Mar. 16, 2017 (JP) .............................. JP2017-051626

(51) Int. Cl.
| | | |
|---|---|---|
| *B60W 30/095* | (2012.01) | |
| *B60W 30/18* | (2012.01) | |
| *B60W 30/09* | (2012.01) | |
| *G08G 1/16* | (2006.01) | |

(52) U.S. Cl.
CPC ........ *B60W 30/0953* (2013.01); *B60W 30/09* (2013.01); *B60W 30/18145* (2013.01); *B60W 30/18154* (2013.01); *G08G 1/166* (2013.01)

(58) Field of Classification Search
CPC .............. B60W 10/184; B60W 10/20; B60W 2420/42; B60W 2420/52; B60W 2550/10; B60W 2710/00; B60W 2710/18; B60W 2710/20; B60W 30/08; B60W 30/09; G01S 13/867; G01S 13/93; G01S 13/931; G01S 2013/9342; G01S 2013/9346; G05D 1/0214; G05D 1/0246; G05D 1/0257
See application file for complete search history.

(56) References Cited

U.S. PATENT DOCUMENTS

| | | | |
|---|---|---|---|
| 2010/0030426 A1* | 2/2010 | Okita | B60W 40/072 |
| | | | 701/41 |
| 2014/0149013 A1 | 5/2014 | Matsuno | |
| 2015/0015383 A1 | 1/2015 | Sugano et al. | |
| 2016/0335892 A1 | 11/2016 | Okada et al. | |
| 2018/0144635 A1* | 5/2018 | Jeon | G08G 1/166 |

FOREIGN PATENT DOCUMENTS

| | | |
|---|---|---|
| CN | 106062852 A | 10/2016 |
| DE | 102013112916 A1 | 5/2014 |
| JP | 05-024524 A | 2/1993 |
| JP | 2004-280453 A | 10/2004 |
| JP | 2005138748 A | 6/2005 |
| JP | 2014-106805 A | 6/2014 |
| JP | 2015170233 A | 9/2015 |
| WO | 2013/122210 A1 | 8/2013 |

* cited by examiner

*Primary Examiner* — Charles J Han
(74) *Attorney, Agent, or Firm* — Sughrue Mion, PLLC

(57) ABSTRACT

A collision avoidance device includes an electronic control unit configured to: determine whether or not an oncoming vehicle enters inside a turning circle of a host vehicle turning; and execute a collision avoidance control in a case where the electronic control unit determines that there is a collision possibility between the host vehicle and the oncoming vehicle, wherein the electronic control unit is configured not to execute the collision avoidance control when the electronic control unit determines that the oncoming vehicle enters inside the turning circle of the host vehicle.

3 Claims, 9 Drawing Sheets

COLLISION AVOIDANCE DEVICE

INCORPORATION BY REFERENCE

The disclosure of Japanese Patent Application No. 2017-051626 filed on Mar. 16, 2017 including the specification, drawings and abstract is incorporated herein by reference in its entirety.

BACKGROUND

1. Technical Field

The present disclosure relates to a collision avoidance device.

2. Description of Related Art

In the related art, as a technical literature relating to collision avoidance at the time of a right turn of a host vehicle, Japanese Unexamined Patent Application Publication No. 2004-280453 (JP 2004-280453 A) is known. The above-described publication discloses a right turn safety confirmation system that sets a predicted right turn trajectory (a predicted trajectory at the time of the right turn) of the host vehicle in front of the right side of the host vehicle, and in a case where an oncoming vehicle reaches the predicted right turn trajectory within a needed right turn time set in advance, determines that there is a collision possibility between the oncoming vehicle and the host vehicle. In the right turn safety confirmation system, in a case where determination is made that there is a collision possibility between the oncoming vehicle and the host vehicle, a warning is issued to a driver for collision avoidance.

SUMMARY

However, in the system of the related art described above, even in a case where determination is made that there is a collision possibility between the oncoming vehicle and the host vehicle, there is a scene where the oncoming vehicle escapes earlier with acceleration of the oncoming vehicle or deceleration of the host vehicle without collision. As described above, even in a case where a driver empirically feels that collision avoidance is unneeded, the system of the related art has a point of improvement regarding a problem that unneeded collision avoidance control is executed.

The present disclosure provides a collision avoidance device capable of suppressing execution of unneeded collision avoidance control.

A first aspect of the disclosure relates to a collision avoidance device including an electronic control unit configured to: determine whether or not an oncoming vehicle enters inside a turning circle of a host vehicle turning; and execute a collision avoidance control in a case where the electronic control unit determines that there is a collision possibility between the host vehicle and the oncoming vehicle, wherein the electronic control unit is configured not to execute the collision avoidance control when the electronic control unit determines that the oncoming vehicle enters inside the turning circle of the host vehicle.

With the collision avoidance device according to the first aspect of the disclosure, when determination is made that the oncoming vehicle enters inside the turning circle of the host vehicle, there is a high possibility that the oncoming vehicle escapes earlier than the host vehicle; thus, the collision avoidance control is not executed. Accordingly, with the collision avoidance device, it is possible to suppress execution of unneeded collision avoidance control to the oncoming vehicle.

A second aspect of the disclosure relates to a collision avoidance device comprising an electronic control unit configured to: determine whether or not there is a collision possibility between a host vehicle turning and an oncoming vehicle under a first determination condition; execute a collision avoidance control in a case where the electronic control unit determines that there is a collision possibility between the host vehicle and the oncoming vehicle under the first determination condition; determine whether or not the oncoming vehicle enters inside a turning circle of the host vehicle; and determine whether or not there is a collision possibility between the host vehicle and the oncoming vehicle under a second determination condition that the electronic control unit hardly determines that there is a collision possibility rather than under the first determination condition in a case where the electronic control unit determines that there is a collision possibility between the host vehicle and the oncoming vehicle under the first determination condition, and the electronic control unit determines that the oncoming vehicle enters inside the turning circle of the host vehicle, wherein the electronic control unit is configured not to execute the collision avoidance control to the oncoming vehicle until the electronic control unit determines that there is a collision possibility between the host vehicle and the oncoming vehicle under the second determination condition when the electronic control unit determines that the oncoming vehicle enters inside the turning circle of the host vehicle.

With the collision avoidance device according to the second aspect of the disclosure, when determination is made that the oncoming vehicle enters inside the turning circle of the host vehicle, the collision avoidance control to the oncoming vehicle is not executed until determination (re-determination) is made that there is a collision possibility between the host vehicle and the oncoming vehicle under the second determination condition stricter than the first determination condition. Accordingly, with the collision avoidance device, the determination condition of a collision possibility is made strict in a case where there is a high possibility that the oncoming vehicle escapes earlier than the host vehicle, whereby it is possible to suppress execution of unneeded collision avoidance control to the oncoming vehicle.

In the collision avoidance device according to the second aspect of the disclosure, the electronic control unit is configured to: determine that there is a collision possibility between the host vehicle and the oncoming vehicle under the first determination condition in a case where a time to collision between the host vehicle and the oncoming vehicle is less than a first threshold; and determine that there is a collision possibility between the host vehicle and the oncoming vehicle under the second determination condition in a case where the time to collision between the host vehicle and the oncoming vehicle is less than a second threshold smaller than the first threshold.

A third aspect of the disclosure relates to a collision avoidance device comprising an electronic control unit configured to: determine whether or not an oncoming vehicle enters inside a turning circle of a host vehicle; determine whether or not there is a collision possibility between the host vehicle and the oncoming vehicle; output a signal for executing collision avoidance control in a case where the electronic control unit determines that there is the collision possibility; and suppress execution of collision avoidance control in a case where the electronic control unit determines that there is a collision possibility when the electronic control unit determines that the oncoming vehicle enters inside the turning circle of the host vehicle rather than when the electronic control unit determines that the oncoming vehicle does not enter inside the turning circle of the host vehicle.

In the collision avoidance device according to the third aspect of the disclosure, the electronic control unit is configured not to execute the collision avoidance control when the electronic control unit determines that the oncoming vehicle enters inside the turning circle of the host vehicle.

In the collision avoidance device according to the third aspect of the disclosure, the electronic control unit is configured to: determine whether or not there is a collision possibility between the host vehicle and the oncoming vehicle under a first determination condition when the electronic control unit determines that the oncoming vehicle does not enter inside the turning circle of the host vehicle, and determine whether or not there is a collision possibility between the host vehicle and the oncoming vehicle under a second determination condition that determination is hardly made that there is a collision possibility rather than under the first determination condition when the electronic control unit determines that the oncoming vehicle enters inside the turning circle of the host vehicle.

In the collision avoidance device according to the third aspect of the disclosure, the electronic control unit is configured to determine that there is a collision possibility between the host vehicle and the oncoming vehicle in a case where a time to collision or an inter-vehicle time between the host vehicle and the oncoming vehicle is less than a first threshold when the electronic control unit determines that the oncoming vehicle does not enter inside the turning circle of the host vehicle, and determine that there is a collision possibility between the host vehicle and the oncoming vehicle in a case where the time to collision or the inter-vehicle time between the host vehicle and the oncoming vehicle is less than a second threshold smaller than the first threshold when the electronic control unit determines that the oncoming vehicle enters inside the turning circle of the host vehicle.

In the collision avoidance device according to the third aspect of the disclosure, the first determination condition may be a case where a time to collision or an inter-vehicle time between the host vehicle and the oncoming vehicle is less than a first threshold. The second determination condition may be a case where the time to collision or the inter-vehicle time between the host vehicle and the oncoming vehicle is less than a second threshold smaller than the first threshold.

As described above, with the collision avoidance device according to the aspects of the disclosure, it is possible to suppress execution of unneeded collision avoidance control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
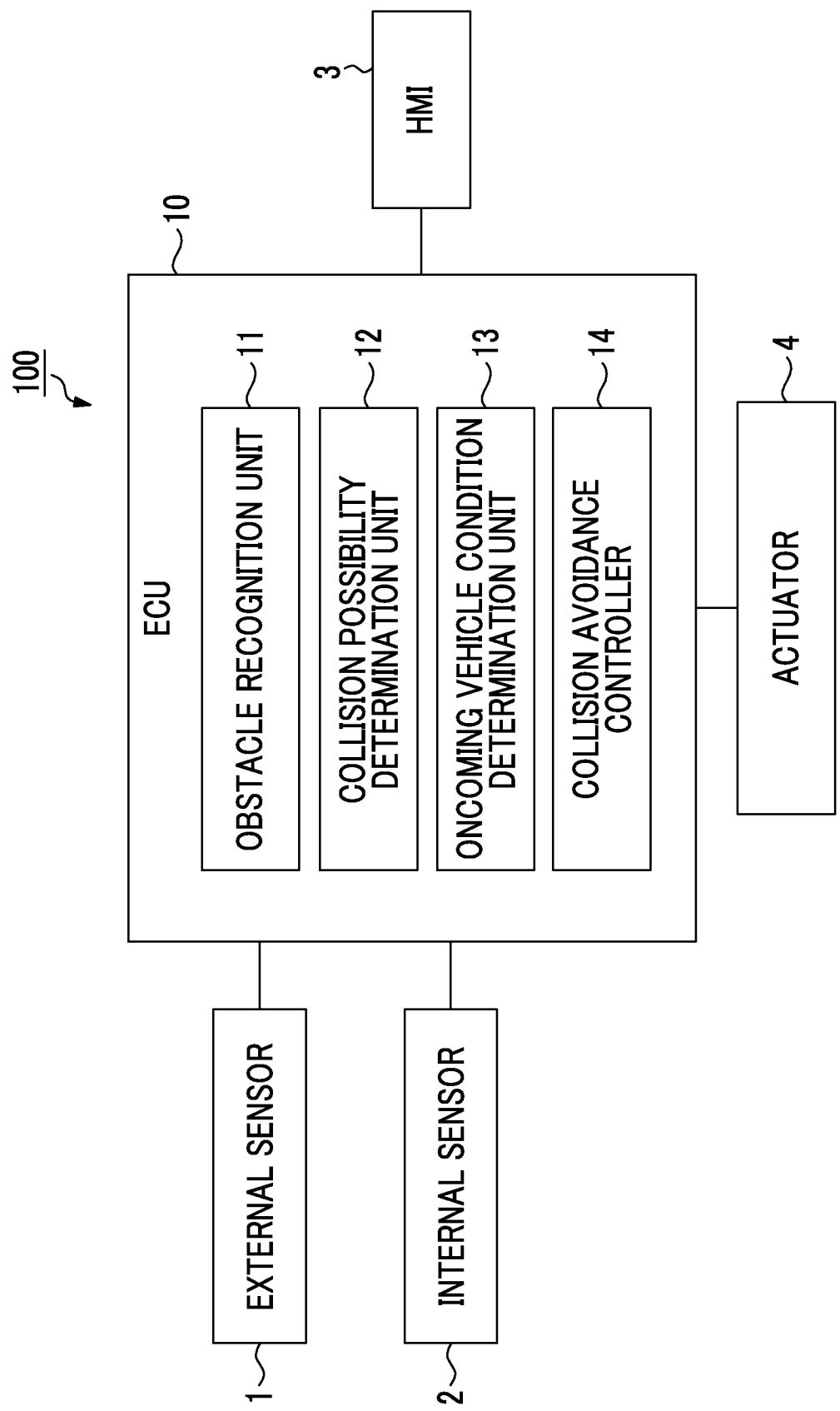
FIG. 1 is a block diagram showing a collision avoidance device according to a first embodiment.

Hereinafter, an embodiment of the disclosure will be described referring to the drawings. The same or similar portions in the respective drawings are represented by the same reference numerals, and overlapping description will not be repeated.

First Embodiment

FIG. 1 is a block diagram showing a collision avoidance device according to a first embodiment. A collision avoidance device 100 shown in FIG. 1 is mounted in a vehicle (host vehicle), such as a passenger vehicle, and determines a collision possibility between the host vehicle and an oncoming vehicle. The collision avoidance device 100 executes collision avoidance control for avoiding a collision between the host vehicle and the oncoming vehicle in a case where determination is made that there is a collision possibility between the host vehicle and the oncoming vehicle. The collision avoidance control in the embodiment is, as an example, control (right-turn oncoming vehicle precrash safety system [PCS] control) for avoiding a collision between an oncoming vehicle and the host vehicle at the time of the right turn of the host vehicle in a left-hand traffic country or zone.

Configuration of Collision Avoidance Device

As shown in FIG. 1, the collision avoidance device 100 according to the embodiment includes an electronic control unit [ECU] 10 that integrally manages the device. The ECU 10 is an electronic control unit having a central processing unit [CPU], a read only memory [ROM], a random access memory [RAM], a controller area network [CAN] communication circuit, and the like. In the ECU 10, for example, various functions are realized by loading a program stored in the ROM on the RAM and executing the program loaded on the RAM on the CPU. The ECU 10 may be constituted of a plurality of electronic units.

The ECU 10 is connected to an external sensor 1, an internal sensor 2, a human machine interface [HMI] 3, and an actuator 4.

The external sensor 1 is detection equipment that detects conditions around the vehicle. The external sensor 1 includes at least one of a camera and a radar sensor.

The camera is imaging equipment that images external conditions of the vehicle. The camera is provided on a rear side of a windshield of the vehicle. The camera transmits imaging information relating to the external conditions of the vehicle to the ECU 10. The camera may be a monocular camera or a stereo camera. The stereo camera has two imaging units disposed so as to reproduce binocular parallax. Imaging information of the stereo camera includes information in a depth direction.

The radar sensor is detection equipment that detects an obstacle around the vehicle using electric waves (for example, millimeter waves) or light. Examples of the radar sensor include a millimeter-wave radar or light detection and ranging [LIDAR]. The radar sensor transmits electric waves or light around the vehicle and receives electric waves or light reflected from obstacles to detect obstacles. The radar sensor transmits detected obstacle information to the ECU 10. Examples of the obstacles include movable obstacles, such as pedestrians, bicycles, and other vehicles, in addition to fixed obstacles, such as guardrails and buildings.

The internal sensor 2 is detection equipment that detects a traveling state and a vehicle state of the host vehicle. The internal sensor 2 includes a vehicle speed sensor, an acceleration sensor, and a yaw rate sensor. The vehicle speed sensor is a detector that detects a speed of the host vehicle. As the vehicle speed sensor, for example, a wheel speed sensor that is provided in a wheel of the host vehicle, a drive shaft configured to rotate integrally with the wheel, or the like, and detects a rotation speed of the wheel is used. The vehicle speed sensor transmits detected vehicle speed information (wheel speed information) to the ECU 10.

The acceleration sensor is a detector that detects an acceleration of the host vehicle. The acceleration sensor includes, for example, a longitudinal acceleration sensor that detects a longitudinal acceleration of the host vehicle, and a lateral acceleration sensor that detects a lateral acceleration of the host vehicle. For example, the acceleration sensor transmits acceleration information of the host vehicle to the ECU 10. The yaw rate sensor is a detector that detects a yaw rate (rotational angular velocity) of the center of gravity of the host vehicle around a vertical axis. As the yaw rate sensor, for example, a gyro sensor can be used. The yaw rate sensor transmits detected yaw rate information of the host vehicle to the ECU 10.

The functional configuration of the ECU 10 will be described. The ECU 10 has an obstacle recognition unit 11, a collision possibility determination unit 12, an oncoming vehicle condition determination unit 13, and a collision avoidance controller 14.

The obstacle recognition unit 11 recognizes an obstacle around the host vehicle based on a detection result of the external sensor 1. The obstacle recognition unit 11 recognizes a position of an obstacle with respect to the host vehicle and a relative moving direction of the obstacle with respect to the host vehicle. The obstacle recognition unit 11 may recognize the types of other obstacles (other vehicles, pedestrians, bicycles, or the like) using known methods. The obstacle recognition unit 11 recognizes an oncoming vehicle that travels in a direction facing the host vehicle using known methods. The oncoming vehicle is not limited to a vehicle that moves in a direction opposite to a front direction of the host vehicle, and may include a vehicle that moves in a direction (for example, a direction included in an angle range of ±15°) within a given angle from a direct opposite direction.

The collision possibility determination unit 12 determines a collision possibility between a turning host vehicle and an oncoming vehicle based on a recognition result of the obstacle recognition unit 11 and a detection result of the internal sensor 2. The collision possibility determination unit 12 recognizes that the host vehicle is turning, for example, in a case where the yaw rate of the host vehicle detected by the yaw rate sensor is equal to or greater than a predetermined threshold.

The collision possibility determination unit 12 estimates a path of the turning host vehicle based on the detection result of the internal sensor 2. For example, the collision possibility determination unit 12 estimates the path of the turning host vehicle based on the yaw rate of the host vehicle detected by the yaw rate sensor and the vehicle speed of the host vehicle detected by the vehicle speed sensor. Hereinafter, the path of the turning host vehicle is referred to as a turning circle. The collision possibility determination unit 12 may estimate the turning circle of the host vehicle using other known methods. The length (the distance between the host vehicle and a tip) of the estimated turning circle may be constant or may be changed according to the vehicle speed of the host vehicle.

The collision possibility determination unit 12 calculates a time to collision (TTC) between the host vehicle and the oncoming vehicle based on the turning circle of the host vehicle. The collision possibility determination unit 12 calculates the time to collision between the host vehicle and the oncoming vehicle using known methods. The collision possibility determination unit 12 determines that there is a collision possibility between the host vehicle and the oncoming vehicle in a case where the time to collision between the host vehicle and the oncoming vehicle is less than a first threshold. The first threshold is a value (for example, 1.4 seconds) set in advance. An inter-vehicle time may be used instead of the time to collision.

Figure 2B:
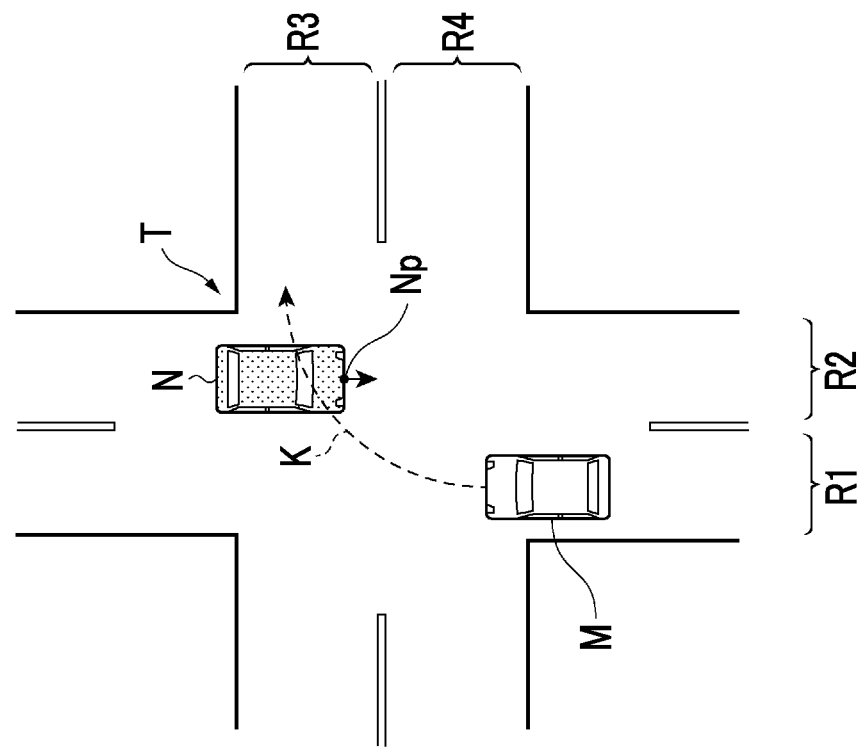
FIG. 2B is a plan view illustrating an example of suppressing unneeded collision avoidance control.
Figure 2A:
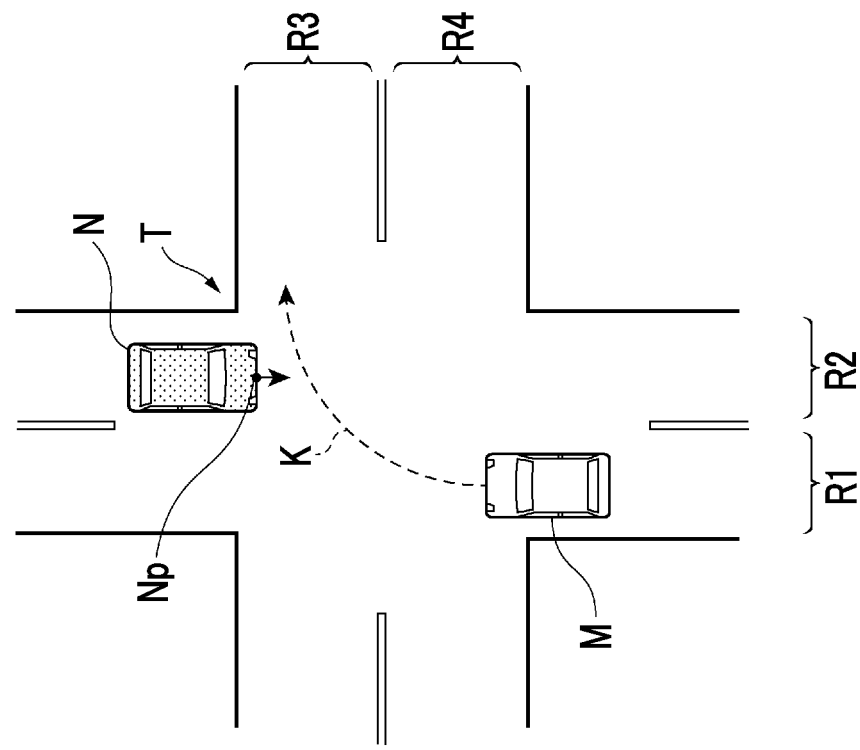
FIG. 2A is a plan view illustrating a case where determination on a collision possibility between a host vehicle and an oncoming vehicle is performed.

FIG. 2A is a plan view illustrating a case where determination on a collision possibility between the host vehicle and the oncoming vehicle is performed. FIG. 2A shows an intersection T, a host vehicle M, a turning circle K of the host vehicle M, an oncoming vehicle N, and a position reference Np of the oncoming vehicle N. The position reference Np of the oncoming vehicle N will be described below. FIG. 2A shows a traveling lane R1 on which the host vehicle M is traveling, an oncoming lane R2 of the traveling lane R1, a right turn destination lane R3 on which the host vehicle M turning right moves, and an oncoming lane R4 of the right turn destination lane R3.

In FIG. 2A, the host vehicle M is about to turn right at the intersection T while crossing the oncoming lane R2, and the oncoming vehicle N is positioned outside the turning circle K of the host vehicle M. In the condition shown in FIG. 2A, the collision possibility determination unit 12 determines that there is a collision possibility between the host vehicle M and the oncoming vehicle N in a case where the time to collision between the host vehicle M and the oncoming vehicle N is less than the first threshold.

Figure 3:
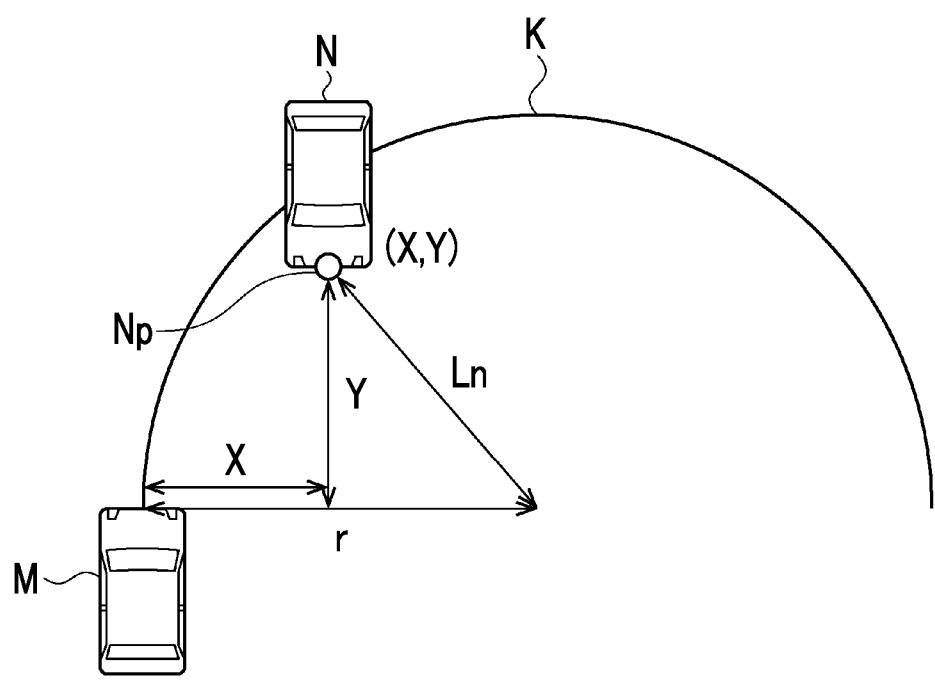
FIG. 3 is a plan view illustrating a condition in which the oncoming vehicle enters inside a turning circle of the host vehicle.

The oncoming vehicle condition determination unit 13 determines whether or not the oncoming vehicle N enters inside the turning circle K of the host vehicle M based on the turning circle K of the host vehicle estimated by the collision possibility determination unit 12 and the recognition result of the obstacle recognition unit 11. FIG. 2B is a plan view illustrating an example of suppressing unneeded collision avoidance control. FIG. 3 is a plan view illustrating a condition in which the oncoming vehicle N enters inside the turning circle K of the host vehicle M. In FIGS. 2B and 3, the oncoming vehicle N is positioned inside the turning circle K of the host vehicle M.

The oncoming vehicle condition determination unit 13 determines whether or not the oncoming vehicle N enters inside the turning circle of the host vehicle M using the position reference Np of the oncoming vehicle N. In this embodiment, the position reference Np of the oncoming vehicle N is set at the center of the front surface of the oncoming vehicle N. The position reference Np of the oncoming vehicle N is not limited to the center of the front surface of the oncoming vehicle N. The position reference Np of the oncoming vehicle N may be set at the left end or right end of the front surface of the oncoming vehicle N or may be set on the back side (the vehicle body side of the oncoming vehicle N) from the front surface. The position reference Np of the oncoming vehicle N may be changed with the vehicle model (passenger vehicle, bus, truck, or the like) of the oncoming vehicle N or may be changed according to the full length of the oncoming vehicle N.

As shown in FIG. 3, the oncoming vehicle condition determination unit 13 recognizes a lateral distance X as the distance between the host vehicle M and the position reference Np of the oncoming vehicle N in a vehicle width direction of the host vehicle M and a longitudinal distance Y as the distance between the host vehicle M and the position reference Np of the oncoming vehicle N in a front-rear direction of the host vehicle M based on the recognition result of the obstacle recognition unit 11. In FIG. 3, as an example, the distance is shown based on the center of the front surface of the host vehicle M. The oncoming vehicle condition determination unit 13 recognizes a turning radius r of the turning circle K of the host vehicle M estimated by the collision possibility determination unit 12. In this case, an oncoming vehicle distance Ln as the distance between the center of the turning circle K and the position reference Np of the oncoming vehicle N can be obtained as $Ln=\sqrt{\{(r-X)^2+Y^2\}}$.

The oncoming vehicle condition determination unit 13 determines that the oncoming vehicle N enters inside the turning circle K of the host vehicle M in a case where the oncoming vehicle distance Ln is smaller than the sum of the turning radius r of the turning circle K and a predetermined value α (in a case of Ln<r+α). α is appropriately set based on an error of external sensor 1 and others. α may be zero. Determination on whether or not the oncoming vehicle N enters inside the turning circle K of the host vehicle M is not limited to the above-described method.

The collision avoidance controller 14 executes the collision avoidance control for avoiding a collision between the host vehicle M and the oncoming vehicle N in a case where the collision possibility determination unit 12 determines that there is a collision possibility between the host vehicle M and the oncoming vehicle N. The collision avoidance control includes at least one of a warning to a driver of the host vehicle M, image display (display on the display) of an alert to the driver of the host vehicle M, braking control of the host vehicle M, and steering control of the host vehicle M. The collision avoidance controller 14 transmits a control signal to the HMI 3 or the actuator 4, thereby executing the collision avoidance control of the host vehicle M.

In the condition shown in FIG. 2A, the collision avoidance controller 14 executes the collision avoidance control, such as the braking control of the host vehicle M, for avoiding a collision between the host vehicle M and the oncoming vehicle N in a case where the collision possibility determination unit 12 determines that there is a collision possibility between the host vehicle M and the oncoming vehicle N.

Even in a case where the collision possibility determination unit 12 determines that there is a collision possibility between the host vehicle M and the oncoming vehicle N, when the oncoming vehicle condition determination unit 13 determines that the oncoming vehicle N enters inside the turning circle K of the host vehicle M, the collision avoidance controller 14 does not execute the collision avoidance control.

In the condition shown in FIG. 2B, the oncoming vehicle condition determination unit 13 determines that the oncoming vehicle N enters inside the turning circle K of the host vehicle M. In this case, even in a case where the collision possibility determination unit 12 determines that there is a collision possibility between the host vehicle M and the oncoming vehicle N, the collision avoidance controller 14 does not execute the collision avoidance control.

Control of Collision Avoidance Device

Control of the collision avoidance device 100 according to the first embodiment will be described.

Collision Avoidance Control

Figure 4:
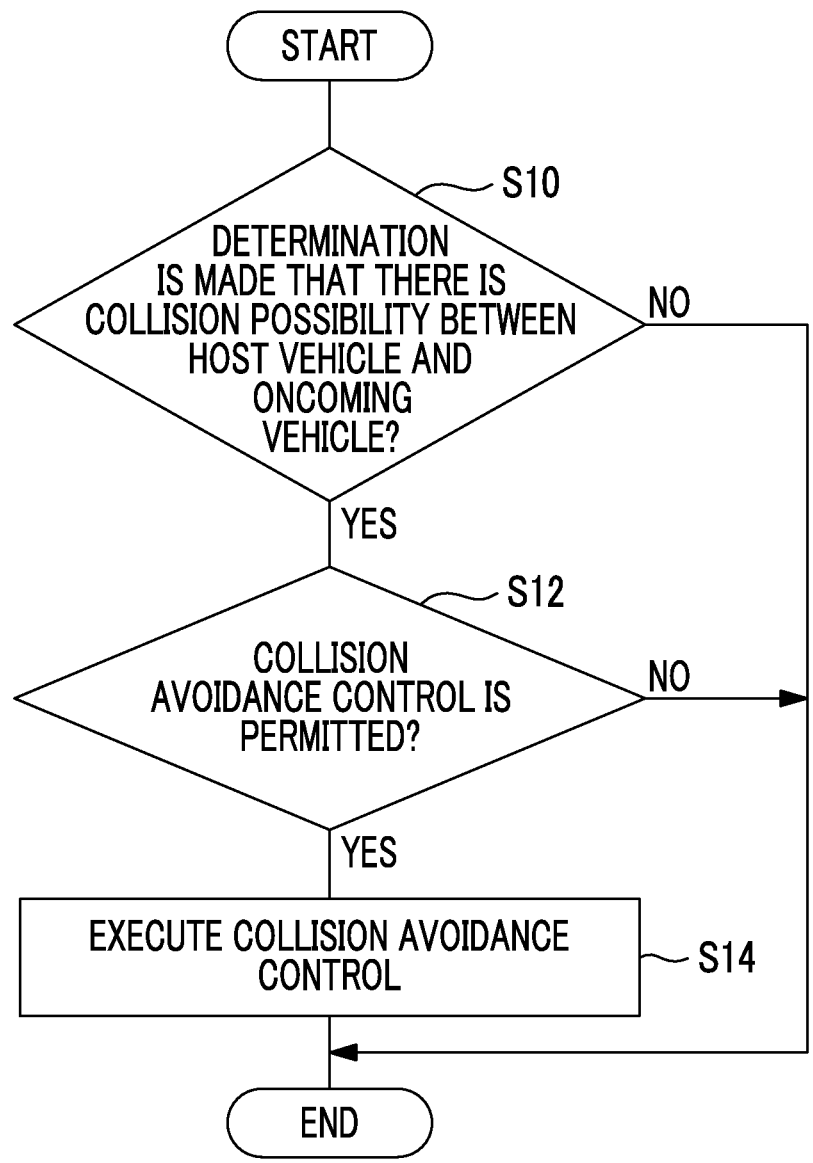
FIG. 4 is a flowchart showing collision avoidance control.

FIG. 4 is a flowchart showing the collision avoidance control. Processing of the flowchart shown in FIG. 4 is performed in a case where the vehicle speed of the host vehicle M is within a given range.

As shown in FIG. 4, the ECU 10 of the collision avoidance device 100 determines whether or not there is a collision possibility between the host vehicle M and the oncoming vehicle N with the collision possibility determination unit 12 as S10. The collision possibility determination unit 12 estimates the path (turning circle K) of the host vehicle M based on the recognition result of the obstacle recognition unit 11 and the detection result of the internal sensor 2, thereby determining whether or not there is a collision possibility between the host vehicle M and the oncoming vehicle N. In a case where determination is made that there is no collision possibility between the host vehicle M and the oncoming vehicle N (S10: NO), the ECU 10 ends the present processing. Thereafter, the ECU 10 repeats the processing from S10 again after a given time elapses. In a case where determination is made that there is a collision possibility between the host vehicle M and the oncoming vehicle N (S10: YES), the ECU 10 progresses to S12.

In S12, the ECU 10 determines whether or not the collision avoidance control is permitted. In a case where the collision avoidance control is not inhibited through inhibition processing of the collision avoidance control described below, the ECU 10 determines that the collision avoidance control is permitted. In a case where determination is made that the collision avoidance control is not permitted (S12: NO), the ECU 10 ends the present processing. Thereafter, the ECU 10 repeats the processing from S10 again in a case where a different obstacle is detected. In a case where determination is made that the collision avoidance control is permitted (S12: YES), the ECU 10 progresses to S14.

In S14, the ECU 10 executes the collision avoidance control for avoiding a collision between the host vehicle M and the oncoming vehicle N with the collision avoidance controller 14. The collision avoidance controller 14 transmits a control signal to the HMI 3 or the actuator 4 to execute the collision avoidance control of the host vehicle M. Thereafter, the ECU 10 ends the present processing.

Inhibition Processing of Collision Avoidance Control

Figure 5:
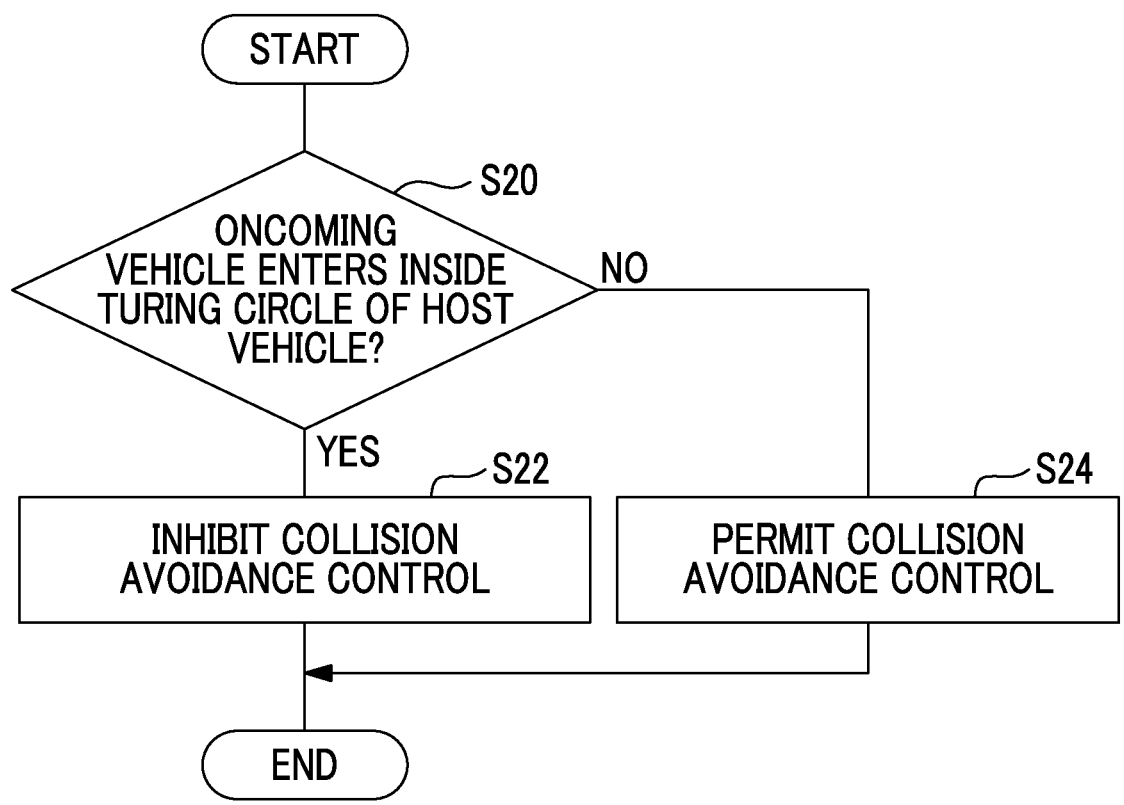
FIG. 5 is a flowchart showing inhibition processing of the collision avoidance control.

FIG. 5 is a flowchart showing inhibition processing of the collision avoidance control. Processing of the flowchart shown in FIG. 5 is performed while the host vehicle M is turning. A start condition may be the detection of the oncoming vehicle N. The processing of the flowchart shown in FIG. 5 ends in a case where the host vehicle M ends turning and returns to a straight moving state.

As shown in FIG. 5, the ECU 10 determines whether or not the oncoming vehicle N enters inside the turning circle K of the host vehicle M with the oncoming vehicle condition determination unit 13 as S20. The oncoming vehicle condition determination unit 13 determines whether or not the oncoming vehicle N enters inside the turning circle K of the host vehicle M based on the turning circle K of the host vehicle M estimated by the collision possibility determination unit 12 and the recognition result of the obstacle recognition unit 11. In a case where determination is made that the oncoming vehicle N enters inside the turning circle K of the host vehicle M (S20: YES), the ECU 10 progresses to S22. In a case where determination is made that the oncoming vehicle N does not enter inside the turning circle K of the host vehicle M (S20: NO), the ECU 10 progresses to S24.

In S22, the collision avoidance controller 14 inhibits the collision avoidance control. Thereafter, the ECU 10 ends the present processing.

In S24, the collision avoidance controller 14 permits the collision avoidance control. Thereafter, the ECU 10 ends the present processing. Thereafter, the ECU 10 ends the present processing and repeats the processing from S20 again after a given time elapses. The ECU 10 may omit the processing of S24.

Functional Effect of Collision Avoidance Device according to First Embodiment

With the collision avoidance device 100 according to the first embodiment described above, even in a case where determination is made that there is a collision possibility between the host vehicle M and the oncoming vehicle N, when determination is made that the oncoming vehicle N enters inside the turning circle K of the host vehicle M, there is a high possibility that the oncoming vehicle N escapes earlier than the host vehicle M; thus, the collision avoidance control is not executed. Accordingly, with the collision avoidance device 100, it is possible to suppress execution of unneeded collision avoidance control to the oncoming vehicle N.

Second Embodiment

Figure 6:
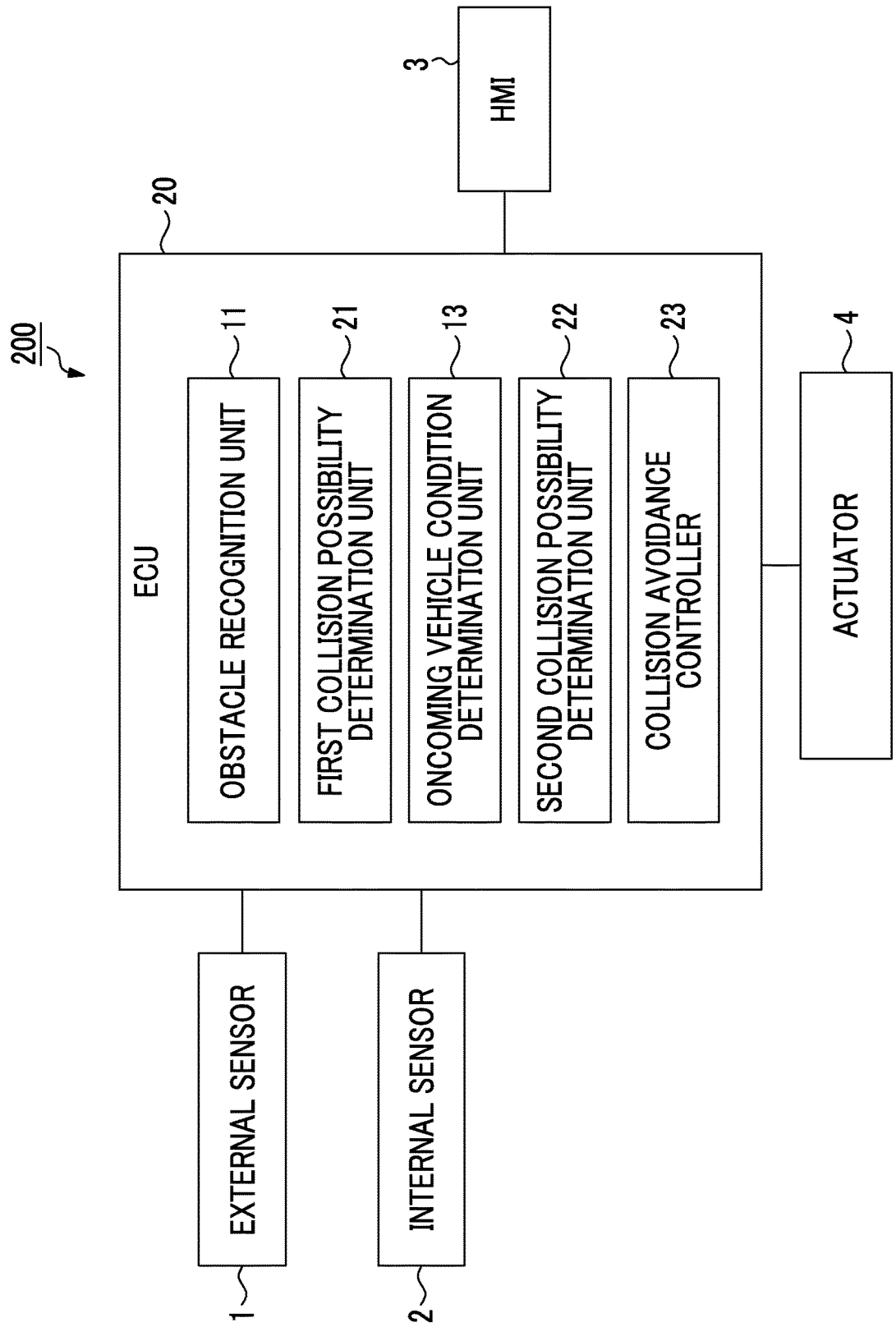
FIG. 6 is a block diagram showing a collision avoidance device according to a second embodiment.

A collision avoidance device according to a second embodiment will be described referring to the drawings. FIG. 6 is a block diagram showing a collision avoidance device 200 according to the second embodiment. The collision avoidance device 200 shown in FIG. 6 is different from the first embodiment in that, when determination is made that the oncoming vehicle N enters inside the turning circle K of the host vehicle M, a condition for determination on a collision possibility is made strict instead of not executing the collision avoidance control.

Configuration of Collision Avoidance Device

As shown in FIG. 6, an ECU 20 of the collision avoidance device 200 according to the second embodiment is different from the first embodiment in that a first collision possibility determination unit 21 and a second collision possibility determination unit 22 are provided. A function of a collision avoidance controller 23 is different.

The first collision possibility determination unit 21 determines whether or not there is a collision possibility between the turning host vehicle M and the oncoming vehicle N based on the recognition result of the obstacle recognition unit 11 and the detection result of the internal sensor 2 with a first determination condition. The first determination condition is, for example, a condition that the time to collision between the host vehicle M and the oncoming vehicle N is less than a first threshold. The first collision possibility determination unit 21 determines that the first determination condition is satisfied in a case where the time to collision between the host vehicle M and the oncoming vehicle N is less than the first threshold, and determines that there is a collision possibility between the host vehicle M and the oncoming vehicle N. The first threshold is a value (for example, 1.4 seconds) set in advance as in the first embodiment. That is, the first collision possibility determination unit 21 may have the same function as the collision possibility determination unit 12 according to the first embodiment.

In a case where the first collision possibility determination unit 21 determines that there is a collision possibility between the host vehicle M and the oncoming vehicle N, when the oncoming vehicle condition determination unit 13 determines that the oncoming vehicle N enters inside the turning circle K of the host vehicle M, the second collision possibility determination unit 22 determines whether or not there is a collision possibility between the turning host vehicle M and the oncoming vehicle N under a second determination condition.

The second collision possibility determination unit 22 determines whether or not there is a collision possibility between the host vehicle M and the oncoming vehicle N under a second determination condition based on the recognition result of the obstacle recognition unit 11 and the detection result of the internal sensor 2. The second determination condition is a condition that determination is hardly made that there is a collision possibility rather than the first determination condition. The second determination condition is, for example, a condition that the time to collision between the host vehicle M and the oncoming vehicle N is less than a second threshold smaller than the first threshold. The second threshold is a value (for example, 0.6 seconds) set in advance.

In a case where the time to collision between the host vehicle M and the oncoming vehicle N is less than the second threshold, the second collision possibility determination unit 22 determines that the second determination condition is satisfied, and determines that there is a collision possibility between the host vehicle M and the oncoming vehicle N.

In a case where the first collision possibility determination unit 21 determines that there is a collision possibility between the host vehicle M and the oncoming vehicle N, when the oncoming vehicle condition determination unit 13 determines that the oncoming vehicle N does not enter inside the turning circle K of the host vehicle M, the collision avoidance controller 23 executes the collision avoidance control to the oncoming vehicle N.

When the oncoming vehicle condition determination unit 13 determines that the oncoming vehicle N does not enter inside the turning circle K of the host vehicle M, the collision avoidance controller 23 does not execute the collision avoidance control until the second collision possibility determination unit 22 determines that the time to collision between the host vehicle M and the oncoming vehicle N is less than the second threshold.

Control of Collision Avoidance Device

Control of the collision avoidance device 200 according to the second embodiment will be described.

Collision Avoidance Control

Figure 7:
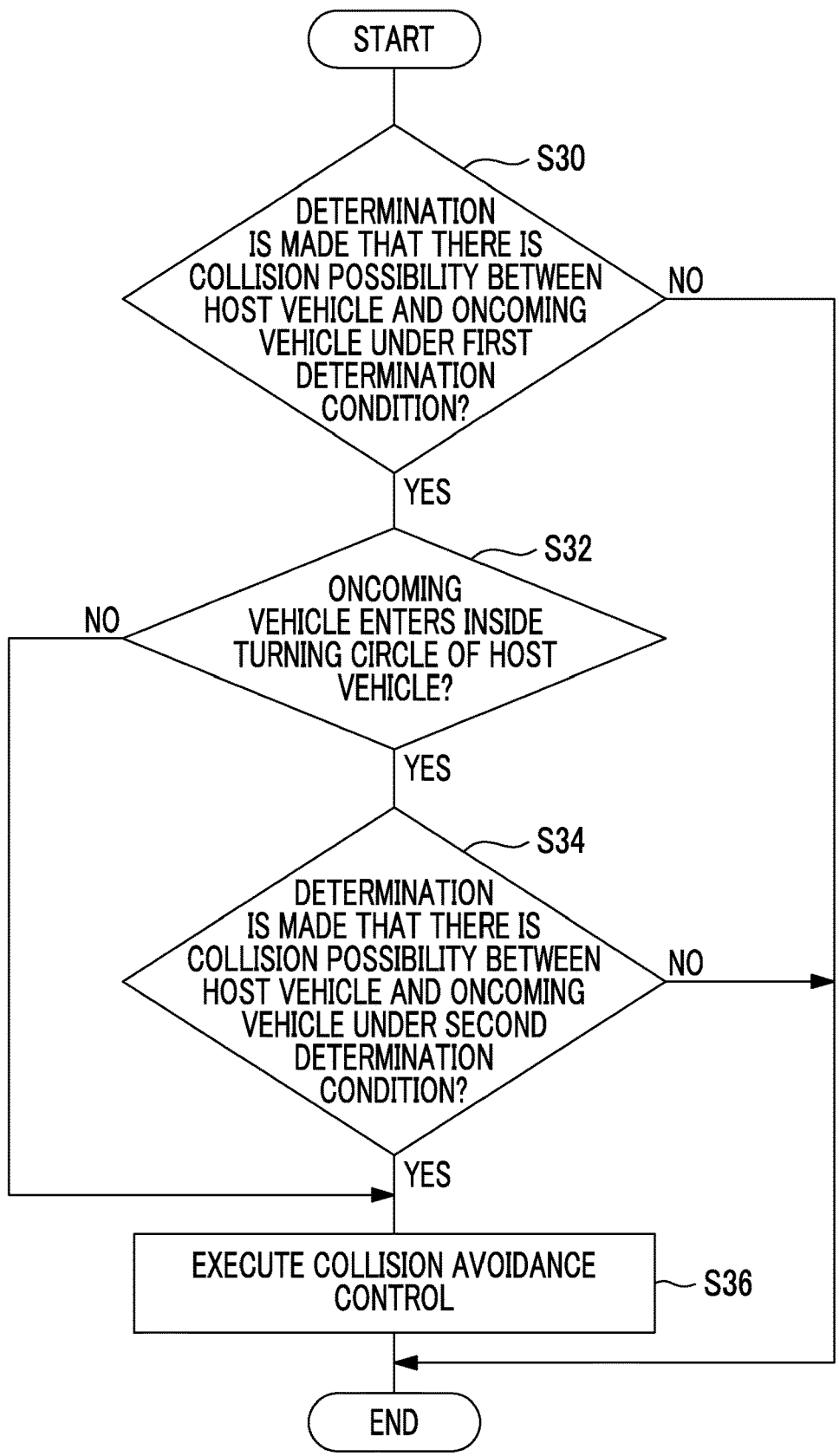
FIG. 7 is a flowchart showing collision avoidance control in the second embodiment.

FIG. 7 is a flowchart showing the collision avoidance control in the second embodiment. Processing of the flowchart shown in FIG. 7 is performed in a case where the vehicle speed of the host vehicle M is within a given range.

As shown in FIG. 7, the ECU 20 of the collision avoidance device 200 determines whether or not there is a collision possibility between the host vehicle M and the oncoming vehicle N under the first determination condition with the first collision possibility determination unit 21 as S30. In a case where determination is made that there is no collision possibility between the host vehicle M and the oncoming vehicle N under the first determination condition (S30: NO), the ECU 20 ends the present processing. Thereafter, the ECU 20 repeats the processing from S30 again in a case where a different obstacle is detected. In a case where determination is made that there is a collision possibility between the host vehicle M and the oncoming vehicle N under the first determination condition (S30: YES), the ECU 20 progresses to S32.

In S32, the ECU 20 determines whether or not the oncoming vehicle N enters inside the turning circle K of the host vehicle M with the oncoming vehicle condition determination unit 13. In a case where determination is made that the oncoming vehicle N enters inside the turning circle K of the host vehicle M (S32: YES), the ECU 20 progresses to S34. In a case where determination is made that the oncoming vehicle N does not enter inside the turning circle K of the host vehicle M (S32: NO), the ECU 20 progresses to S36.

In S34, the ECU 20 determines whether or not there is a collision possibility between the host vehicle M and the oncoming vehicle N under the second determination condition with the second collision possibility determination unit 22. In a case where determination is made that there is no collision possibility between the host vehicle M and the oncoming vehicle N under the second determination condition (S34: NO), the ECU 20 ends the present processing. Thereafter, the ECU 20 repeats the processing from S30 again in a case where a different obstacle is detected. In a case where determination is made that there is a collision possibility between the host vehicle M and the oncoming vehicle N under the second determination condition (S34: YES), the ECU 20 progresses to S36.

In S36, the ECU 20 executes the collision avoidance control for avoiding a collision between the host vehicle M and the oncoming vehicle N with the collision avoidance controller 23. The collision avoidance controller 23 transmits a control signal to the HMI 3 or the actuator 4, thereby executing the collision avoidance control of the host vehicle M. Thereafter, the ECU 20 ends the present processing.

Functional Effects of Collision Avoidance Device according to Second Embodiment

With the collision avoidance device 200 according to the second embodiment described above, even in a case where determination is made that there is a collision possibility between the host vehicle M and the oncoming vehicle N under the first determination condition based on the time to collision between the host vehicle and the oncoming vehicle, when determination is made that the oncoming vehicle N enters inside the turning circle K of the host vehicle M, the collision avoidance control to the oncoming vehicle is not executed until determination (re-determination) is made that there is a collision possibility between the host vehicle M and the oncoming vehicle N under the second determination condition stricter than the first determination condition. Accordingly, with the collision avoidance device 200, the determination condition of the collision possibility is made strict in a case where there is a high possibility that the oncoming vehicle N escapes earlier than the host vehicle M, whereby the collision avoidance control is not executed until the time to collision becomes less than the second threshold smaller than the first threshold. For this reason, it is possible to suppress execution of unneeded collision avoidance control to the oncoming vehicle N.

In a case where the second threshold is set to a negative value or the like such that the second collision possibility determination unit 22 constantly determines that there is no collision possibility, the same result as in the first embodiment is obtained.

Although a preferred embodiment of the disclosure has been described as above, the disclosure is not limited to the above-described embodiment. The disclosure may be subjected to various modifications and improvements based on common knowledge of those skilled in the art including the embodiment described above.

For example, in the embodiment, although an example in a left-hand traffic country or zone has been described, the disclosure can be appropriately carried out in a right-hand traffic country or zone.

Figure 8:
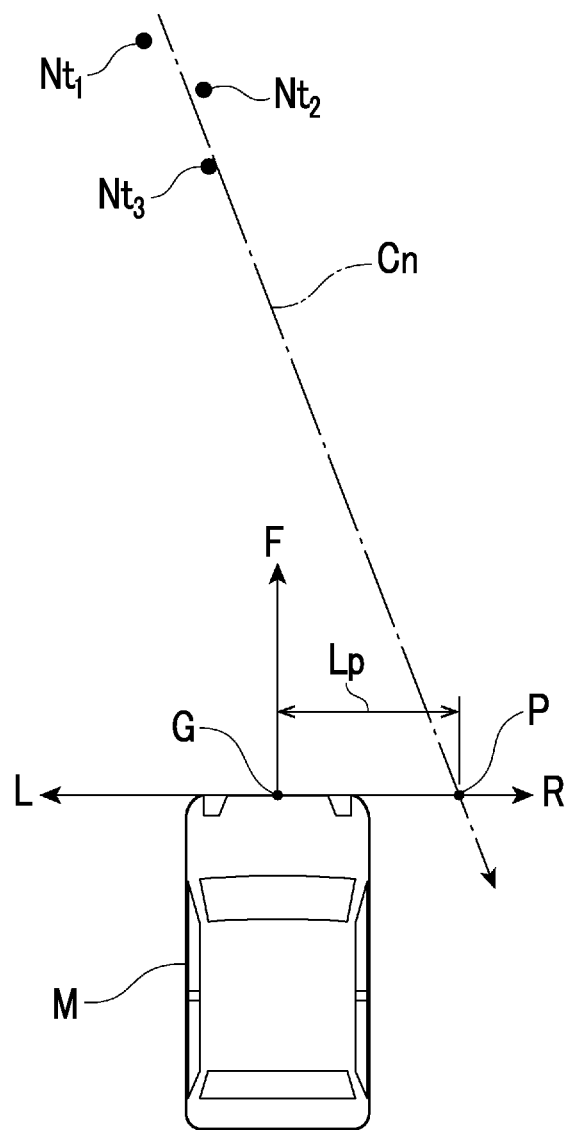
FIG. 8 is a diagram illustrating another example of determination on a collision possibility.

The collision possibility determination unit 12 according to the first embodiment may determine whether or not there is a collision possibility between the host vehicle M and the oncoming vehicle N using a planar coordinate system based on the host vehicle M. FIG. 8 is a diagram illustrating another example of determination on a collision possibility. FIG. 8 shows relative positions $Nt_1$ to $Nt_3$ of the oncoming vehicle N at times t1 to t3 in the planar coordinate system based on the host vehicle M. In the planar coordinate system based on the host vehicle M, the center of the front surface of the host vehicle M is set as a coordinate origin G, a coordinate axis extending in front of the host vehicle M is set as F, a coordinate axis extending in a right direction of the host vehicle M is set as R, and a coordinate axis extending in a left direction of the host vehicle M is set as L. The coordinate axis R and the coordinate axis L are collectively referred to as a lateral coordinate axis LR.

The collision possibility determination unit 12 recognizes a temporal change (for example, a change in the position of the obstacle for the last 300 milliseconds) of the position of the oncoming vehicle N based on the recognition result of the obstacle recognition unit 11. The collision possibility determination unit 12 performs correction corresponding to an estimation result of the path of the host vehicle on the temporal change of the position of the oncoming vehicle N based on the estimated turning circle K of the host vehicle M and the temporal change of the position of the oncoming vehicle N, thereby performing coordinate conversion to the planar coordinate system based on the host vehicle M to obtain the relative positions $Nt_1$ to $Nt_3$. The relative positions $Nt_1$ to $Nt_3$ can be obtained using known methods.

Subsequently, the collision possibility determination unit 12 performs linear approximation based on the relative positions $Nt_1$ to $Nt_3$ of the oncoming vehicle N using known methods, such as random sample consensus [RANSAC], thereby obtaining a relative path estimation straight line Cn of the oncoming vehicle N in the planar coordinate system based on the host vehicle M. The collision possibility determination unit 12 obtains an intersection point P of the relative path estimation straight line Cn of the oncoming vehicle N and the lateral coordinate axis LR of the planar coordinate system.

The collision possibility determination unit 12 determines whether or not there is a collision possibility between the host vehicle M and the oncoming vehicle N based on the distance Lp between the intersection point P and the coordinate origin G. The collision possibility determination unit 12 determines that there is no collision possibility between the host vehicle M and the oncoming vehicle N in a case where the distance Lp between the intersection point P and the coordinate origin G is equal to or greater than a distance threshold. The collision possibility determination unit 12 determines that there is a collision possibility between the host vehicle M and the oncoming vehicle N in a case where the distance Lp between the intersection point P and the coordinate origin G is less than the distance threshold. The distance threshold is a value set in advance.

In the first collision possibility determination unit 21 and the second collision possibility determination unit 22 according to the second embodiment, determination on a collision possibility shown in FIG. 8 can also be performed. In this case, the first collision possibility determination unit 21 can set a condition that the distance Lp between the intersection point P and the coordinate origin G is less than a first distance threshold as a first determination condition.

In this case, the first collision possibility determination unit 21 calculates the distance Lp between the intersection point P and the coordinate origin G through the same processing as in the above-described collision possibility determination unit 12. The first collision possibility determination unit 21 determines that the first determination condition is not satisfied in a case where the distance Lp between the intersection point P and the coordinate origin G is equal to or greater than the first distance threshold, and determines that there is no collision possibility between the host vehicle M and the oncoming vehicle N. The first collision possibility determination unit 21 determines that the first determination condition is satisfied in a case where the distance Lp between the intersection point P and the coordinate origin G is less than the first distance threshold, and determines that there is a collision possibility between the host vehicle M and the oncoming vehicle N. The first distance threshold is a value set in advance.

The second collision possibility determination unit 22 can set a condition that the distance Lp between the intersection point P and the coordinate origin G is less than a second distance threshold smaller than the first distance threshold as a second determination condition. That is, the second collision possibility determination unit 22 determines that the second determination condition is not satisfied in a case where the distance Lp between the intersection point P and the coordinate origin G is equal to or greater than the second distance threshold, and determines that there is no collision possibility between the host vehicle M and the oncoming vehicle N. The second collision possibility determination unit 22 determines that the second determination condition is satisfied in a case where the distance Lp between the intersection point P and the coordinate origin G is less than the second distance threshold, and determines that there is a collision possibility between the host vehicle M and the oncoming vehicle N. The second distance threshold is a value set in advance as a value smaller than the first distance threshold.

In a case where the collision possibility determination unit 12 determines that there is a collision possibility between the host vehicle M and the obstacle, when the collision avoidance control is not inhibited, the collision avoidance device 100 according to the first embodiment does not need to execute the collision avoidance control. In a case where the collision possibility determination unit 12 determines that there is a collision possibility between the host vehicle M and the obstacle, even when the collision avoidance control is not inhibited, the collision avoidance device 100 may determine the need for the execution of the collision avoidance control in consideration of various other conditions.

Even when the first collision possibility determination unit 21 determines that there is a collision possibility between the host vehicle M and the oncoming vehicle N, and the oncoming vehicle condition determination unit 13 determines that the oncoming vehicle N does not enter inside the turning circle K of the host vehicle M, the collision avoidance device 200 according to the second embodiment does not need to execute the collision avoidance control. Similarly, even in a case where the second collision possibility determination unit 22 determines that there is a collision possibility between the host vehicle M and the oncoming vehicle N, the collision avoidance device 200 does not need to execute the collision avoidance control. The collision avoidance device 200 may determine the need for the execution of the collision avoidance control in consideration of various other conditions.

A form may be made in which the collision avoidance device 100 does not perform determination on a collision possibility when the oncoming vehicle condition determination unit 13 determines that the oncoming vehicle N enters inside the turning circle K of the host vehicle M. That is, when the oncoming vehicle condition determination unit 13 determines that the oncoming vehicle N enters inside the turning circle K of the host vehicle M, the collision possibility determination unit 12 does not perform determination on whether or not there is a collision possibility between the host vehicle M and the oncoming vehicle N.

Specifically, in the flowchart showing the inhibition processing of the collision avoidance control of FIG. 5, in a case where the collision avoidance control is inhibited in S22, the processing of the flowchart showing the collision avoidance control of FIG. 4 may not be started. With the above description, when the oncoming vehicle condition determination unit 13 determines that the oncoming vehicle N enters inside the turning circle K of the host vehicle M, determination on a collision possibility between the host vehicle M and the obstacle is not performed; thus, the collision avoidance device 100 does not execute the collision avoidance control. Accordingly, when determination is made that the oncoming vehicle N enters inside the turning circle K of the host vehicle M, the collision avoidance device 100 does not execute the collision avoidance control, whereby it is possible to suppress execution of unneeded collision avoidance control.

Similarly, a form may be made in which the collision avoidance device 200 according to the second embodiment does not perform determination on a collision possibility when the oncoming vehicle condition determination unit 13 determines that the oncoming vehicle N enters inside the turning circle K of the host vehicle M. That is, when the oncoming vehicle condition determination unit 13 determines that the oncoming vehicle N enters inside the turning circle K of the host vehicle M, the first collision possibility determination unit 21 does not perform determination on whether or not there is a collision possibility between the host vehicle M and the oncoming vehicle N.

Figure 9:
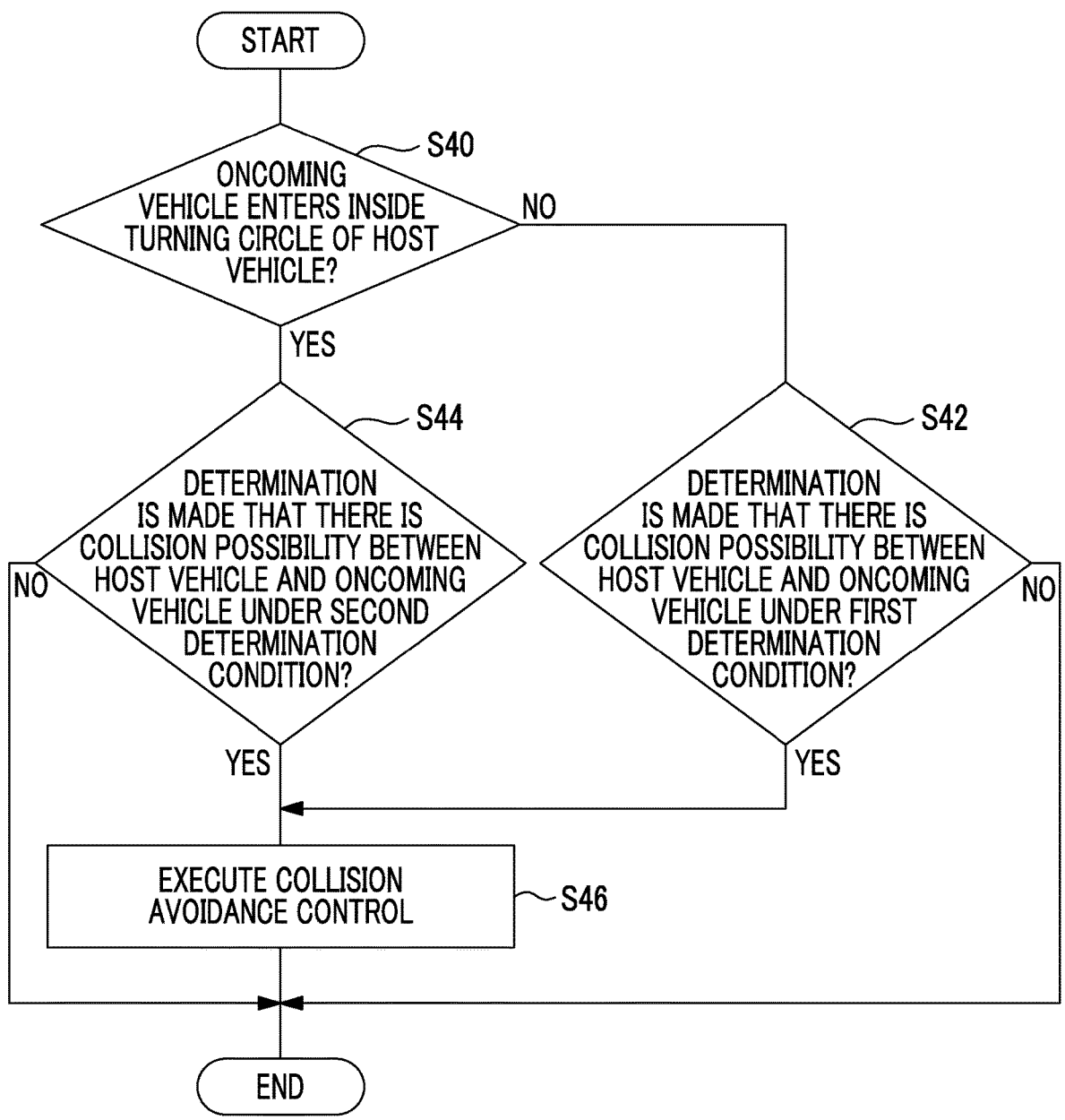
FIG. 9 is a flowchart showing another example of collision avoidance control in the second embodiment.

Specifically, description will be provided referring to FIG. 9. FIG. 9 is a flowchart showing another example of the collision avoidance control in the second embodiment. As shown in FIG. 9, the ECU 20 of the collision avoidance device 200 of the above-described embodiment determines whether or not the oncoming vehicle N enters inside the turning circle K of the host vehicle M with the oncoming vehicle condition determination unit 13 as S40. In a case where determination is made that the oncoming vehicle N does not enter inside the turning circle K of the host vehicle M (S40: NO), the ECU 20 progresses to S42. In a case where determination is made that the oncoming vehicle N enters inside the turning circle K of the host vehicle M (S40: YES), the ECU 20 progresses to S44.

In S42, the ECU 20 determines whether or not there is a collision possibility between the host vehicle M and the oncoming vehicle N under the first determination condition with the first collision possibility determination unit 21. In a case where determination is made that there is no collision possibility between the host vehicle M and the oncoming vehicle N under the first determination condition (S42: NO), the ECU 20 ends the present processing. Thereafter, the ECU 20 repeats the processing from S40 again in a case where a different obstacle is detected. In a case where determination is made that there is a collision possibility between the host vehicle M and the oncoming vehicle N under the first determination condition (S42: YES), the ECU 20 progresses to S46.

In S44, the ECU 20 determines whether or not there is a collision possibility between the host vehicle M and the oncoming vehicle N under the second determination condition with the second collision possibility determination unit 22. In a case where determination is made that there is no collision possibility between the host vehicle M and the oncoming vehicle N under the second determination condition (S44: NO), the ECU 20 ends the present processing. Thereafter, the ECU 20 repeats the processing from S40 again in a case where a different obstacle is detected. In a case where determination is made that there is a collision possibility between the host vehicle M and the oncoming vehicle N under the second determination condition (S44: YES), the ECU 20 progresses to S46.

In S46, the ECU 20 executes the collision avoidance control for avoiding a collision between the host vehicle M and the oncoming vehicle N with the collision avoidance controller 23. The collision avoidance controller 23 transmits a control signal to the HMI 3 or the actuator 4, thereby executing the collision avoidance control of the host vehicle M. Thereafter, the ECU 20 ends the present processing.

In the collision avoidance device 200 of the above-described embodiment, when determination is made that the oncoming vehicle N enters inside the turning circle K of the host vehicle M, the collision avoidance control to the oncoming vehicle is not executed until determination (re-determination) is made that there is a collision possibility between the host vehicle M and the oncoming vehicle N under the second determination condition stricter than the first determination condition. For this reason, it is possible to suppress execution of unneeded collision avoidance control to the oncoming vehicle N.

What is claimed is:

1. A collision avoidance device of a host vehicle, the collision avoidance device comprising an electronic control unit (ECU) configured to:
   determine whether there is a first collision possibility between the host vehicle turning and an oncoming vehicle based on a time to collision being less than a first threshold or an inter-vehicle time between the host vehicle and the oncoming vehicle being less than the first threshold;
   when it is determined that there is the first collision possibility, determine whether the oncoming vehicle enters inside an area delineated by an estimated turning path of the host vehicle;
   when it is determined that the oncoming vehicle enters inside the area delineated by the estimated turning path of the host vehicle, determine whether there is a second collision possibility based on the time to collision being less than a second threshold that is less than the first threshold or the inter-vehicle time between the host vehicle and the oncoming vehicle is less than the second threshold; and
   execute a collision avoidance control when it is determined that there is the second collision possibility between the host vehicle and the oncoming vehicle.

2. The collision avoidance device according to claim 1, wherein the ECU is further configured to:
   determine a lateral distance between the host vehicle and the oncoming vehicle;
   determine a longitudinal distance between the host vehicle and the oncoming vehicle;
   determine a turning radius of the estimated path of the host vehicle;
   determine an oncoming vehicle distance, based on the lateral distance, the longitudinal distance, and the turning radius of the estimated path; and
   determine whether the oncoming vehicle enters into the area inside the estimated path of the host vehicle, based on the oncoming vehicle distance, the turning radius of the estimated path, and a predetermined value.

3. The collision avoidance device according to claim 1, wherein the ECU is further configured to:
   execute the collision avoidance control when it is determined that the oncoming vehicle does not enter into the area inside the estimated path of the host vehicle.

* * * * *